(12) United States Patent
Funada et al.

(10) Patent No.: US 8,368,506 B2
(45) Date of Patent: Feb. 5, 2013

(54) SENSING DEVICE AND SYSTEM, CONTROLLING METHOD AND CONTROL PROGRAM

(75) Inventors: Junichi Funada, Tokyo (JP); Tomohito Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 12/669,172

(22) PCT Filed: Jul. 17, 2008

(86) PCT No.: PCT/JP2008/062902
§ 371 (c)(1),
(2), (4) Date: Apr. 12, 2010

(87) PCT Pub. No.: WO2009/011380
PCT Pub. Date: Jan. 22, 2009

(65) Prior Publication Data
US 2010/0188188 A1    Jul. 29, 2010

(30) Foreign Application Priority Data

Jul. 19, 2007 (JP) .................................. 2007-188286

(51) Int. Cl.
*G05B 23/02* (2006.01)
(52) U.S. Cl. ....................................................... 340/3.1
(58) Field of Classification Search .................. 340/3.1, 340/5.1, 4.11, 4.13, 4.14, 12.22, 13.24; 700/245, 700/249, 264, 231, 259
See application file for complete search history.

(56) References Cited

FOREIGN PATENT DOCUMENTS

| JP | 2002331482 A | 11/2002 |
|---|---|---|
| JP | 2003291084 A | 10/2003 |
| JP | 2003306106 A | 10/2003 |
| JP | 2006004116 A | 1/2006 |

OTHER PUBLICATIONS

International Search Report for PCT/JP2008/062902 mailed Oct. 7, 2008.
K. Kise et al., "Current Status and Future Prospects of Camera-Based Character Recognition and Document Image Analysis", Technical Report of IEICE, IEICE Study Group of Pattern Recognition and Media Understanding, Mar. 2005, pp. 1-6.

*Primary Examiner* — Nabil Syed

(57) ABSTRACT

A sensing device includes a situation acquisition unit acquiring information on situation of a site of interest sensed; a sensing range change unit changing sensing range of the situation acquisition unit; a position identification unit identifying position of the situation acquisition unit; and a sensing operation controlling unit which detects inhibited content, a subject of inhibition of transmission, from the information on the situation of the site of interest. If the inhibited content has been detected, the sensing operation controlling unit calculates position of the inhibited content based on the position identification information from the position identification unit. The sensing operation controlling unit controls the sensing range change unit, based on the position identification information including the position of inhibited content calculated, so that the position of inhibited content is not contained in the sensing range. An inhibited content detection unit outputs information on the site of interest to an operation terminal upon non-detection of inhibited content.

10 Claims, 5 Drawing Sheets

FIG. 3 (EXEMPLARY EMBODIMENT 1)

SENSING DEVICE AND SYSTEM, CONTROLLING METHOD AND CONTROL PROGRAM

REFERENCE TO RELATED APPLICATION

This application is the National Phase of PCT/JP2008/062902, filed Jul. 17, 2008, which is based upon and claims the benefit of the priority of Japanese patent application No. 2007-188286 filed on Jul. 19, 2007, the disclosure of which is incorporated herein in its entirety by reference thereto.

TECHNICAL FIELD

This invention relates to a sensing device and a sensing system for transmitting one or both of an image and the speech as sensed on a site of interest to a remote site. This invention also relates to a corresponding controlling method and a corresponding control program.

BACKGROUND ART

Recently, due to such factors as retirement of the people of the baby-boom generation en masse, smaller numbers of children and aging of population in general, there is a fear of shortage in the labor power. There is thus an accelerated movement towards substituting a robot for part of the labor power. However, the current robot is not sufficient in its ability to recognize the environment, objects or speech, such that certain limitations are imposed on the sort of the operations that the robot can perform autonomously in homes or working places. It may thus be contemplated that a human being in a remote place operates the robot over a network, including the Internet. By such remote control of the robot, it may become possible for a robot to offer more intelligent variable services, not possible to date, such as understanding the user's speech to operate as instructed, doing a variety of operations in need of recognition of objects, or evading an obstacle in getting to the destination. In view of such concept, it may become a reality that a user of a robot recruits a person on the Internet who will operate the robot to carry out a job the user desires being done, and that the person who has applied operates the robot by remote operation to get some remunerative for his/her work.

In such remote operation of the robot, it becomes necessary that the image or the speech around the robot is transmitted to the person who operates the robot by remote control. However, if the site of use of the robot is a home or a working place, there are present objects or sounds that, the user does not desire being seen or heard by a third party. There may also be occasions where the user is not desirous that the person remote-operating the robot comprehends where or with whom the robot is operating. In short, in operating the robot by remote control, such a technique is needed that may deal successfully with the problem of privacy.

As a conventional technique that may deal successfully with the problem of privacy, Patent Document 1, for example, discloses a robot device including an imaging means for imaging the surrounding situation, a transmitting means for transmitting the image information, derived from an output of the imaging means, to an operating means, and a first alerting means. The first alerting means sends out a preset first alarm to outside in case the transmitting means is sending out the image information to the operating means. Patent Document 2 discloses a robot having a function of the visual sense. The robot includes a camera for capturing an image, a detection means for detecting the angle of the line of sight between the direction of the line of sight of a camera and a predetermined reference direction, and a field of view controlling means. The field of view controlling means controls the field of view of the robot, based on processing the image captured by the camera, in case the angle of the line of sight as detected by the camera exceeds a preset value.

Patent Document 1:
JP Patent Kokai Publication No. JP-P2002-331482A
Patent Document 2:
JP Patent Kokai Publication No. JP-P2003-291084A
Non-Patent Document 1:
Koichi Kise et al., 'Current Status and Future Prospects of Camera-Based Character Recognition and Document Image Analysis', IEICE Study Group of Pattern Recognition and Media Understanding, March 2005

SUMMARY

The entire disclosures of the above-mentioned Patent Documents 1 and 2, and Non-Patent Document 1 are incorporated herein by reference thereto. An analysis on the related technologies by the present inventor will be given below.

In the related technology, it may not be possible, without excessively restrain the image, second transmitted, that the user near the robot does not feel uneasy as to if a scene the user does not desire being seen might be seen (by a third party) or as to if a sound the user does not desire being heard might be heard (by a third party). The reason is now explained.

Patent Document 2 discloses a first method of preventing that an image peeping from below is acquired by having the robot's neck not face upwards, and a second method of detecting a portion of a scene of an image that may safely be seen and blurring the other portion of the image so that such other portion will be invisible. With the first method, in which the robot is not directed in an orientation not desired by the user, the user may feel easy because he/she may intuitively recognize that the image is not being transmitted. However, the upwardly looking image ceases to be acquired unanimously, such that even an image that may safely be transmitted cannot be transmitted. It is thus feared that the information cannot be sufficiently transmitted to the user as the destination of transmission. With the second method, even though it is understood that the information other than the needed information is deleted, the user may feel uneasy if the scene not desired to be seen is actually seen if the sensor such as the robot's camera is directed in an orientation not desired by the user.

It is therefore a principal object of the present invention to provide a sensing device in which the information the user near the robot does not desire being seen or heard by a remote operator may correctly be detected so as not to be transmitted to the remote operator.

In a first aspect of the present invention, there is provided as sensing device for transmitting one or both of image and sound (including voice/speech, hereinafter) sensed at a site of interest to a remote location. The sensing device comprises: a situation acquisition unit that acquires the information on the situation of a site of interest including at least one out of an image and the speech that have sensed the situation of the site of interest. The sensing device also comprises a sensing range change unit that changes the sensing range within which the situation acquisition unit may acquire the information on the situation of the site of interest. The sensing device also comprises a position identification unit that identifies position of the situation acquisition unit with respect to an environment of the site of interest, and an inhibited content detection unit. The inhibited content detection unit detects an inhibited content, an object of inhibition of transmission, from the information on the situation of the site of interest acquired by the situation acquisition unit. The inhibited content detection unit also calculates, in case the inhibited content has been detected, the position of the inhibited content in the environment of the site of interest, based on the position identification information from the position identification unit. The inhibited content detection unit writes, in a storage unit, the inhibited position information including the position of the inhibited content in the environment of the site of interest calculated. The sensing device also comprises a sensing operation controlling unit that controls, based on the inhibited position information stored in the storage unit, the sensing range change unit so that the position of the inhibited content is not contained in the sensing range. The inhibited content detection unit outputs, in case the inhibited content has not been detected, the preset information on the situation of the site of interest from the situation acquisition unit to an operation terminal.

In a second aspect of the present invention, there is provided a system for transmitting one or both of image and sound sensed at a site of interest to a remote location, the system comprises a sensing device defined as above and an operation terminal having an output unit for outputting the information on the situation of the site of interest as sensed by the sensing device.

In a third aspect of the present invention, there is provided a controlling method for controlling transmission so as to transmit one or both of image and sound sensed at a site of interest to a remote location. The controlling method comprises: a step of a sensing device acquiring the information on the situation of a site of interest including at least one out of image and sound that have been sensed at a situation of the site of interest, and a step of, by the sensing device, identifying an own position with respect to the environment of the site of interest. The controlling method also comprises a step of, by the sensing device, detecting an inhibited content, an object of inhibition of transmission, from the information on the situation of the site of interest, calculating, in case the inhibited content has been detected, the position of the inhibited content in the environment of the site of interest, based on the position identification information identified, and storing the information on the inhibited position including the position of the inhibited content in the environment of the site of interest calculated. The controlling method also comprises a step of, by the sensing device, controlling the sensing range, based on the inhibited position information stored, so that the position of the inhibited content is not contained in the sensing range. The method further comprises a step of, by the sensing device, outputting, in case the inhibited content has not been detected, the information on the situation of the site of interest acquired to an operation terminal.

In a fourth aspect of the present invention, there is provided a controlling program for causing a sensing device to execute transmission of one or both of image and sound sensed at a site of interest to a remote location. The controlling program causes a sensing device to execute: a step of acquiring the information on the situation of a site of interest including at least one out of an image and the speech that have sensed the situation of the site of interest. The controlling program also causes the sensing device to execute a step of identifying an own position with respect to the environment of the site of interest, and a step of detecting an inhibited content, an object of inhibition of transmission, from the information on the situation of the site of interest, calculating, in case the inhibited content has been detected, the position of the inhibited content in the environment of the site of interest, based on the position identification information identified, and storing the information on the inhibited position including the position of the inhibited content in the environment of the site of interest calculated. The controlling program also causes the sensing device to execute a step of controlling the sensing range, based on the inhibited position information stored, so that the position of the inhibited content is not contained in the sensing range, and a step of outputting, in case the inhibited content has not been detected, the information on the situation of the site of interest acquired to an operation terminal.

According to the present invention, the image/sound may be transmitted without imposing excess limitations on the image/sound transmitted, as the user in the vicinity of the sensing device does not feel uneasy as to if the scene he/she is not desirous to have a third party view is being viewed. In short, the user may explicitly be advised of the fact that what he/she is not desirous to have a third party see or hear has not been acquired by the sensing device.

Explanations of symbols are given in the text.

PREFERRED MODES

In the sensing device according to the present invention, the situation acquisition unit is preferably composed of a plurality of sensors having different sensing ranges. The inhibited content detection unit preferably detects the inhibited content even from the information on the situation of the site of interest from one or more of the sensors not transmitted to the operation terminal.

In the sensing device according to the present invention, the sensing operation controlling unit on receipt from the operation terminal of the remote operation information including an operation command preferably calculates whether or not the inhibited content is comprised within the sensing range in case the operation command in the remote operation information is executed. This calculation is made in consideration of the position identification information from the position identification unit at a time point of receipt of the remote operation information and the inhibited position information stored in the storage unit. The sensing operation controlling unit preferably controls the sensing range change unit, based on the operation command, in case the inhibited content is not comprised within the sensing range.

In the sensing device according to the present invention, if the inhibited content is comprised within the sensing range, the sensing operation controlling unit preferably refrains from controlling the sensing range change unit based on the operation command.

In the sensing device according to the present invention, if the inhibited content is comprised within the sensing range, the sensing operation controlling unit preferably generates the safe movement path information including a path of movement such that the inhibited content is not comprised within the sensing range. The sensing operation controlling unit controls the sensing range change unit, based on the safe movement path information, in case the safe movement path information has been generated.

In the sensing device according to the present invention, the sensing operation controlling unit preferably refrains from controlling the sensing range change unit based on the operation command in case the safe movement path information has not been generated.

In the system according to the present invention, the operation terminal preferably includes an input unit that inputs the remote control information.

Exemplary Embodiment 1

Figure 1:
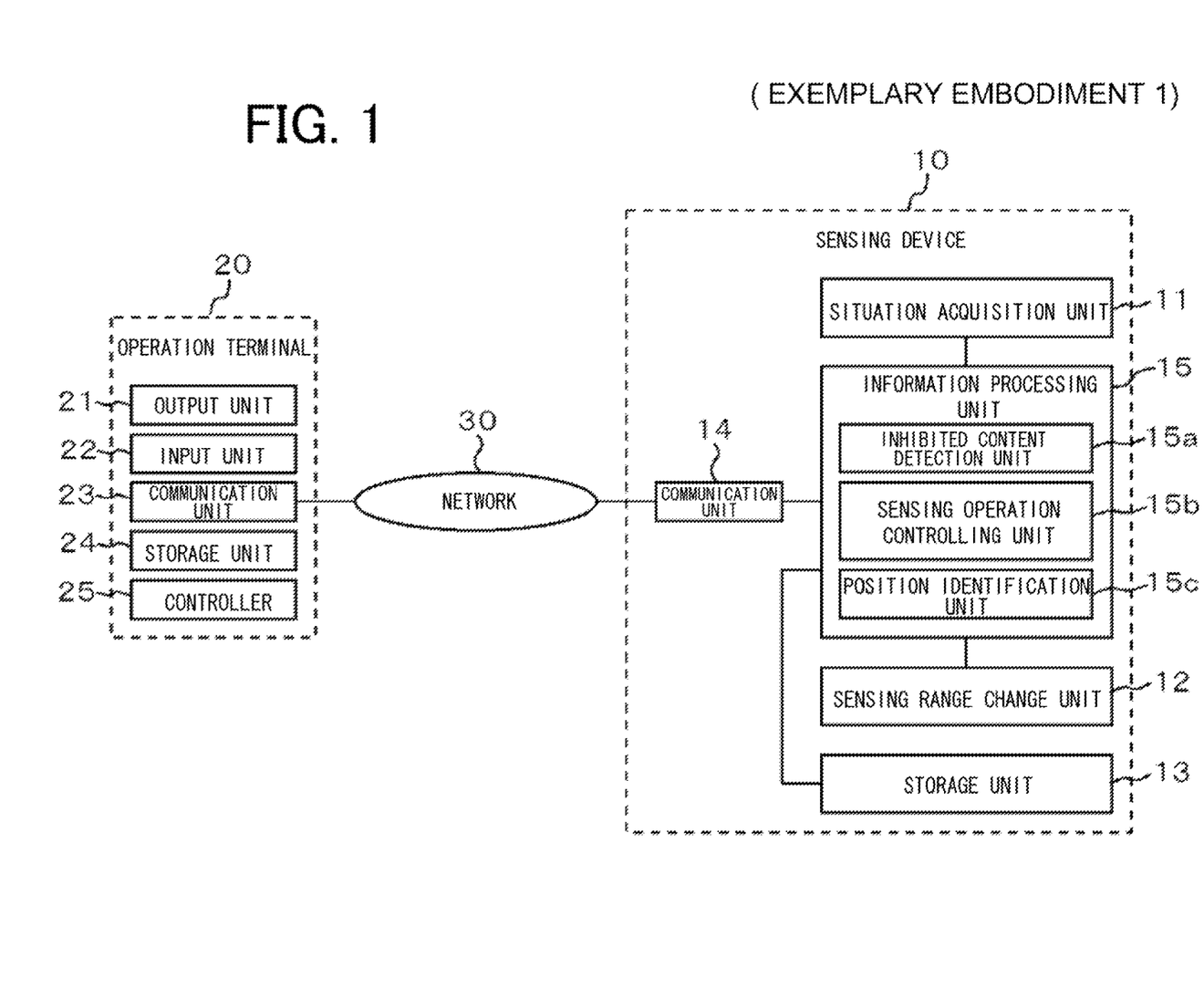
FIG. 1 is a block diagram schematically showing the configuration of a sensing device according to Exemplary Embodiment 1 of the present invention.
Figure 2:
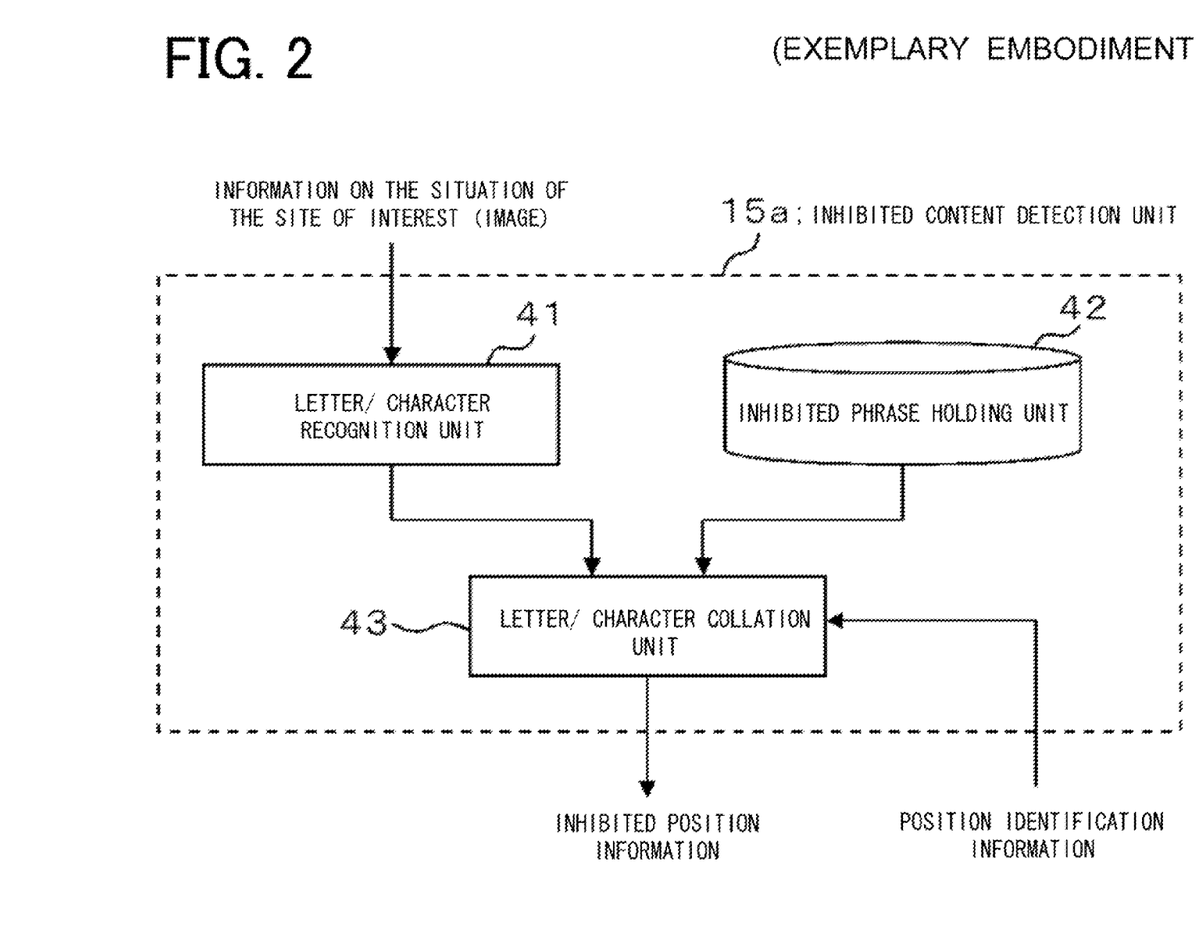
FIG. 2 is a block diagram schematically showing the configuration of an inhibited content detection unit in the sensing device according to Exemplary Embodiment 1 of the present invention.

A sensing device according to Exemplary Embodiment 1 of the present invention will now be described with reference to the drawings. FIG. 1 depicts a block diagram schematically showing the configuration of a sensing device according to Exemplary Embodiment 1 of the present invention. FIG. 2 depicts a block diagram schematically showing the configuration of an inhibited content detection unit in the sensing device according to Exemplary Embodiment 1 of the present invention.

The sensing device 10 is a device or a system for transmitting one or both of the image and the speech, as sensed on a site of interest, to a remote location. The sensing device 10 may, for example, be a robot provided with a camera and/or a microphone. It may also be a device or a system for transmitting the situation on a site of interest, as sensed by a camera or a microphone, to a remote location. Such camera or microphone may be provided on a TV phone, a Web camera, an image monitor system or a monitor robot. The sensing device 10 is connected for remote communication with an operation terminal 20 over a network 30. The sensing device 10 includes a situation acquisition unit 11, a sensing range change unit 12, a storage unit 13, a communication unit 14 and an information processing unit 15.

The situation acquisition unit 11 operates to acquire the information on the site of interest at least including one or both of image and sound (including voice or speech). The information on the site of interest is the sensed information of the situation of the site of interest. The situation acquisition unit 11 outputs the so acquired information on the situation of the site of interest to the information processing unit 15. The situation acquisition unit 11 is made up of a plurality of sensors of different sensing enabling constitutions, and may, for example, be one or more of CCD or CMOS cameras or microphones. The situation acquisition unit 11 may acquire only an image or only the speech. The situation acquisition unit 11 acquires the information (image or sound) having restricted orientations, instead of acquiring the information (image or sound) of the total of the orientations of the site of interest. For example, the situation (scenery) acquisition unit 11 may be composed of a first camera having only the forward field of view and a second camera having the side and rear fields of view. In such case, the images of the first and second cameras may be sent to the information processing unit 15, with the image only of the first camera being sent to the operation terminal 20. In such case, it is possible with the information processing unit 15 (inhibited content detection unit 15a) to detect the inhibited content even from an image(s) other than the image of the first camera transmitted to the operation terminal 20.

The sensing range change unit 12 operates to change the sensing range, such as orientations or zooming, of the situation acquisition unit 11 (camera or microphone). The sensing range change unit 1 has the function of changing the orientation of the situation acquisition unit 11, and is made up of a table on which the camera or the microphone is set and an electric motor that causes movement or rotation of the table relative to a main robot member. The sensing range change unit may also be a device for movement, such as castor or wheel, which causes movement or rotation of the main robot member inclusive of the situation acquisition unit 11.

A storage unit 13 stores the information, such as preset data or a program. The storage unit 13 retains the position information in the ambient atmosphere of the inhibited content as detected by the inhibited content detection unit 15a of the information processing unit 15. For the storage unit 13 to retain the position information, the storage unit may have a map of the environment of the robot and the object of the inhibited content may then be placed on the map for storage.

The communication unit 14 operates to transmit/receive the preset information. The communication unit 14 may be directly connected to the network 30 or may also be relayed by a computer and thence connected to the network 30.

The information processing unit 15 operates to process the preset information based on the program. The information processing unit 15 includes, as principal operation units, implemented on the basis of the program, a sensing operation controlling unit 15b and a position identification unit 15c, in addition to the above mentioned inhibited content detection unit 15a.

The inhibited content detection unit 15a operates to detect the inhibited content as the subject of inhibition of transmission in the information on the site of interest (image or sound) as acquired by the situation acquisition unit 11. The inhibited content detection unit 15a inputs the information on the site of interest (image or sound) acquired by the situation acquisition unit 11. The inhibited content detection unit then detects whether or not the pre-registered inhibited content may be detected from the input information on the situation of the site of interest. If the inhibited content detection unit 15a is unable to detect the inhibited content, it outputs to the communication unit 14 that part of the input information on the situation of the site of interest which may safely be transmitted to the operation terminal 20. If the inhibited content detection unit 15a has detected the inhibited content with success, it calculates the position of the inhibited content (inhibited position) in the environment of the site of interest, based on the position information identified by the position identification unit 15c. The inhibited content detection unit then writes in the storage unit 13 the information on the position of inhibition, inclusive of the position of the inhibited content, in the environment of the site of interest calculated. In detecting the position of the inhibited content in the environment of the site of interest, the distance between the inhibited content and the camera may be found by using stereoscopic view with a plurality of cameras, motion stereo or a laser range finder, in addition to using the position on the image which is to be transmitted to the operation terminal 20. The relative position of the inhibited content relative to the camera may then be calculated from the so calculated distance and the position on the image.

If the inhibited content is an image, the inhibited content is a face of a person, a particular letter/character string, a particular object or a particular area. If the inhibited content is sound (voice or speech), the inhibited content is a particular uttered content, particular utterance of a person, a particular talk or a particular background sound.

In case the inhibited content is an image and is a particular letter/character string, the inhibited content detection unit 15a includes a letter/character recognition unit 41, an inhibited phrase holding unit 42 and a letter/character collation unit 43 (see FIG. 2). The letter/character recognition unit 41 detects a letter/character area from an image of the information on the site of interest, delivered from the situation acquisition unit 11, to recognize the letter/character string in the detected letter/character area. The letter/character recognition unit 41 may be implemented by using the optical letter/character readout technique as disclosed in Non-Patent Document 1, for instance. The inhibited phrase holding unit 42 holds the letter/character string the user on the site of interest does not desire being transmitted. The letter/character string, the user on the site of interest does not desire being disclosed, such as a name of a person, a telephone number, a mail address or a password, may be registered in the inhibited phrase holding unit 42. The letter/character collation unit 43 collates the letter/character string, recognized by the letter/character recognition unit 41, to the letter/character string, held by the inhibited phrase holding unit 42. If the two coincide with each other, the letter/character collation unit 43 calculates the size of the letter/character string and its position on the image based on the position identification information (the information from the position identification unit 15c). The letter/character collation unit then outputs the so calculated letter/character string position.

Based on the total of the inhibited position information, retained in the storage unit 13, the sensing operation controlling unit 15b operates to control the range of sensing by the sensing range change unit 12 so that the position of the inhibited content in the environment of the site of interest will not be included in the sensing range of the situation acquisition unit 11. On detection of the inhibited content by the inhibited content detection unit 15a, the sensing operation controlling unit 15b controls the sensing range change unit 12 so that the inhibited content will be outside the sensing range. For example, if the inhibited content, such as a face or a letter/character string, is detected by the inhibited content detection unit 15a in an image of the information on the site of interest, the sensing operation controlling unit 15b calculates, from the position thereof on the image and from the field angle or the resolution, as parameters proper to the camera, which degree of rotation of the camera will move the object to outside the range of the field angle of the camera. It is now assumed that, if the lens distortion may be presumed to be small, the field angle in the vertical direction is $\theta y$ degrees and that in the horizontal direction is $\theta x$ degrees. It is also assumed that the image of the information on the site of interest acquired is a digital image, and the number of pixels in the vertical direction is Sy pixels and that in the horizontal direction is Sx pixels. Under this assumption, such a case is considered in which an area of the inhibited content is present in an area on the image that is Lx vertical pixels and Ly horizontal pixels centered about a coordinate (x, y) on the image (coordinate system having the center of the image as a point of origin). In this case, the orientation of the inhibited content is $((2\theta x)x/Sx)$ degrees in the horizontal direction and $((2\theta y)y/Sy)$ degrees in the vertical direction. Thus, if the camera is moved by $((2\theta x)x)(x+(Lx/2)Sx)$ degrees in the horizontal direction to further take the size of the inhibited content into consideration, the inhibited content may be moved to outside of the field angle. That is, the camera is controlled to be rotated so that the entire area of the inhibited content will be moved to outside of the camera's field angle. Of course, the camera or the robot in its entirety may be moved, instead of being rotated, so that the inhibited area will not be picked up by the camera. Or, a stereoscopic view by a plurality of cameras, motion stereo or a laser range finder may be used in addition to using the position on the image to find the distance between the inhibited content and the camera. The relative position of the inhibited content relative to the camera is then calculated based on the distance thus found and the position on the image. The camera's field angle is then further considered to change the position or the orientation of the camera so that the inhibited area will not be picked up by the camera. If a plurality of sensors having different sensing ranges are used in the situation acquisition unit 11, and the information of only a fraction of the sensors is transmitted to the operation terminal 20, the inhibited content is detected from the information from the sensors the information of which is not transmitted to the operation terminal 20. In addition, the relative position is detected, and the sensing range change unit 12 is controlled so that the position will not be contained in the sensing range of the sensor information transmitted to the operation terminal 20.

The position identification unit 15c operates to identify (calculate) the positions of the sensing device 10 and the situation acquisition unit 11 relative to the environment of the site of interest. The position identification unit 15c outputs the information on the identified positions, including the positions and the orientations of the sensing device 10 and the situation acquisition unit 11, to the inhibited content detection unit 15a. For example, such a case is considered in which a sensor (situation acquisition unit 11) is mounted on a mobile robot (sensing device 10) and the sensor may be moved on the robot to desired positions or in desired orientations. In such case, the position identification unit 15c is able to identify the position or the orientation of the robot with reference to the environment of the site of interest to identify the position or the orientation of the sensor relative to the environment of the site of interest from the information of the identified robot position. In this case, the position or the orientation of the robot relative to the environment of the site of interest may be found by a method of acquiring the amount of rotation of the wheeled robot by an encoder and integrating the so acquired amount of rotation. Or, the robot's position or orientation may be found by observing a landmark mounted beforehand in the environment of the site of interest by a camera and by comparing it to the previously measured landmark location.

The operation terminal 20 is a computer terminal used by an operator, and includes an output unit 21, an input unit 22, a communication unit 23, a storage unit 24 and a controller 25. The output unit 21 is a display that outputs an image or the speech, such as LCD, CRT or the like display, or a sound outputting unit, such as a loudspeaker or a headphone. The input unit 22 is a unit that inputs the preset information by input means, such as a keyboard or a mouse. The communication unit 23 operates to transmit/receive the defined information concerned. The storage unit 24 operates to hold the information, such as data or programs. The controller 25 controls various constituent parts and performs preset operations based on the program. The operation terminal 20 outputs the information on the situation on the site of interest (display or sound output) as received by the communication unit 23.

A network 30 is an information communication network for interconnecting the sensing device 10 and the operation terminal 20 by wired or wireless transmission means. The network 30 may be omitted in case the sensing device 10 and the operation terminal 20 are directly interconnected by wired or wireless transmission means.

Figure 3:
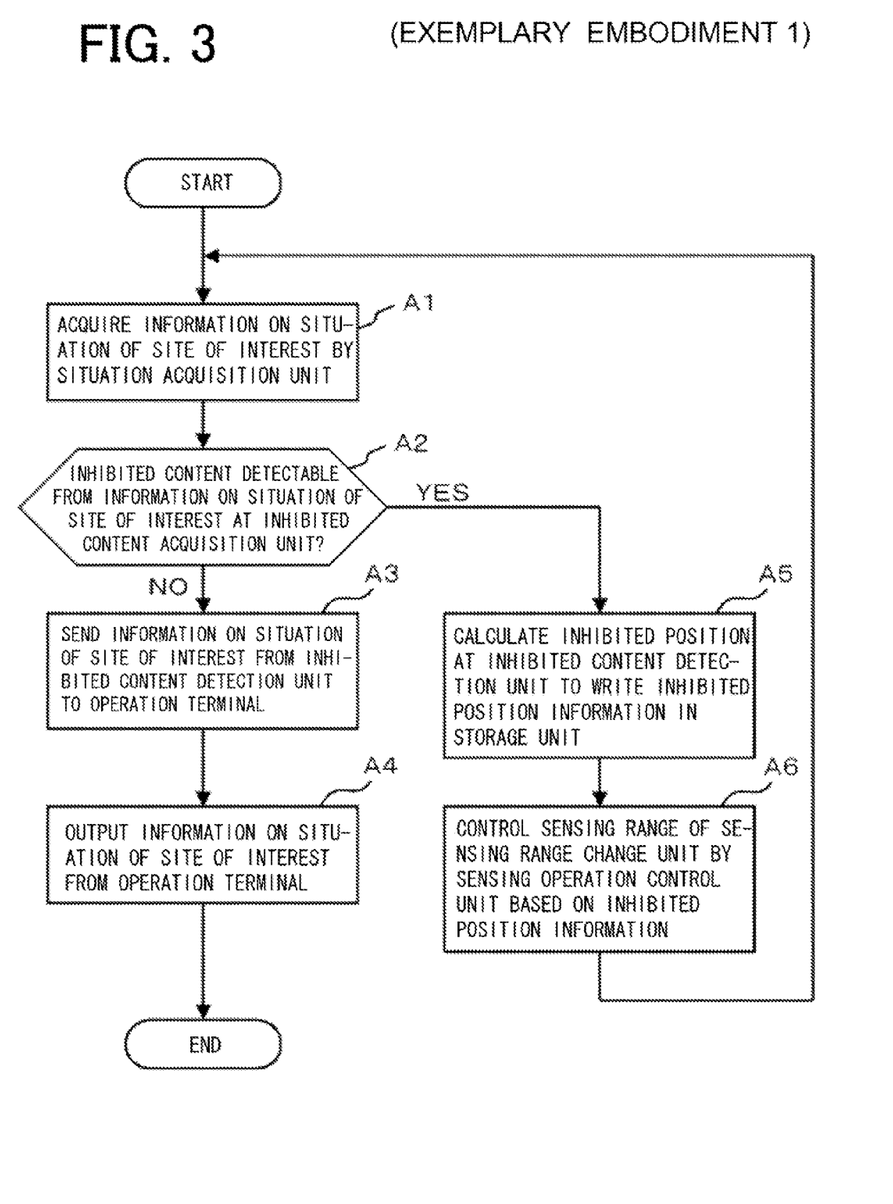
FIG. 3 is a flowchart schematically showing the operation of the sensing device according to Exemplary Embodiment 1 of the present invention.

The operation of the sensing device of Exemplary Embodiment 1 of the present invention will now be described with reference to the drawings. FIG. 3 depicts a flowchart schematically showing the operation of the sensing device according to Exemplary Embodiment 1 of the present invention. As regards the constituent parts of the sensing device, reference may be made to FIG. 1.

First, the situation acquisition unit 11 acquires the information on the situation of the site of interest (at least one or both of the image and the sound) in step A1. The inhibited content detection unit 15a then decides whether or not the pre-registered inhibited content can be detected from the information on the situation of the site of interest as acquired by the situation acquisition unit 11 (step A2).

If the inhibited content is not detectable (NO in step A2), the inhibited content detection unit 15a transmits the fraction of the input information on the situation of the site of interest that can be transmitted via the communication unit 14 to the operation terminal 20 (step A3). After step S3, the operation terminal 20 receives the information on the situation of the site of interest and outputs the so received information at the output unit 21 (display or sound output) in step A4 to terminate the processing.

If the inhibited content has been detected (YES of step A2), the inhibited content detection unit 15a calculates, in step A5, the position of the inhibited content in the environment (inhibited position) based on the position identification information by the position identification unit 15c. The inhibited content detection unit then writes the information on the inhibited position, inclusive of the calculated position of the inhibited content in the environment of the site of interest, in the storage unit 13. After step A5, the sensing operation controlling unit 15b controls the sensing range of the sensing range change unit 12, based on the total of the inhibited position information stored in the storage unit 13, so that the position of the inhibited content in the environment of the site of interest will not be contained in the sensing range of the situation acquisition unit 11 (step A6). Then, processing reverts to step A1.

In the Exemplary Embodiment 1, it is possible not to transmit the inhibited content to the operation terminal 20. Moreover, the user may explicitly be advised of the fact that what he/she is not desirous to have others see or hear has not been acquired by the sensing device 10. Hence, the image/sound may be transmitted without the user feeling uneasy about it. For example, the camera (situation acquisition unit 11) is diverted from the inhibited content during the operations. Thus, the user in the vicinity of the sensing device 10 is able to explicitly confirm that the inhibited content has not been captured as an image in the camera.

Exemplary Embodiment 2

A sensing device according to Exemplary Embodiment 2 of the present invention will now be described.

In the sensing device of Exemplary Embodiment 2, an operator may act on the input unit (22 of FIG. 1) of the operation terminal (20 of FIG. 1) to enable the sensing range of the sensing range change unit (12 of FIG. 1) to be changed under control of the sensing operation controlling unit (15b of FIG. 1). Otherwise, the present Exemplary Embodiment 2 is the same as Exemplary Embodiment 1.

The sensing operation controlling unit (15b of FIG. 1) receives the information on the remote operation from the operation terminal (20 of FIG. 1) via the network (30 of FIG. 1) and the communication unit (14 of FIG. 1). The sensing operation controlling unit then calculates which inhibited content is comprised in the sensing range of the situation acquisition unit (11 of FIG. 1) in case of execution of an operation command in the information on the remote operation. This calculation is made as the sensing operation controlling unit takes account of the identification position information of the position identification unit (15c of FIG. 1) at the time juncture of receipt of the remote operation information, that is, the position or orientation of the situation acquisition unit (11 of FIG. 1), and the position of the inhibited position information as stored in a storage unit (13 of FIG. 1). If, as a result of the calculation, the sensing operation controlling unit (15b of FIG. 1) has determined that the inhibited content is not comprised in the sensing range, it controls the sensing range change unit (12 of FIG. 1) based on the operation command in the remote operation information. If the sensing operation controlling unit has determined that the inhibited content is comprised in the sensing range, it refrains from transmitting the operation command in the remote operation information to the sensing range change unit 12.

In case the information on the destination of movement of the sensing device (10 of FIG. 1) or on the desired camera orientation has been sent by the operation command, the sensing operation controlling unit (15b of FIG. 1) may be configured to calculate the route of the sensing device (10 of FIG. 1) to the destination or the route of the camera to get to the desired orientation. It is noted that the calculation is to be performed so that the inhibited content as stored in the storage unit (13 of FIG. 1) will not be included in an area of the field of view of the camera during the course of movement of the camera to the destination or to the desired orientation.

In case the situation acquisition unit (11 of FIG. 1) is a camera or a microphone, the input unit (22 of FIG. 1) of the operation terminal (20 of FIG. 1) has a human interface configured for controlling e.g. the position, orientation or sensitivity of the camera or the microphone. When acted on by an operator, the input unit (22 of FIG. 1) sends the remote operation information, inclusive of the operation command, via the communication unit (23 of FIG. 1) to the sensing device (10 of FIG. 1). In this manner, the operator at a remote place is able to control the position or orientation of a sensor on the sensing device (10 of FIG. 1) or the position or orientation of the sensing device (10 of FIG. 1) itself.

It is noted that Exemplary Embodiment 2 may be used in an application in which a robot, as the sensing device (10 of FIG. 1), is controlled as the situation is grasped from a remote place via the output unit (21 of FIG. 1). Thus, Exemplary Embodiment 2 may be used in such a situation in which an operator in a remote place acts on a robot to offer services to the user who is near the robot.

Figure 4:
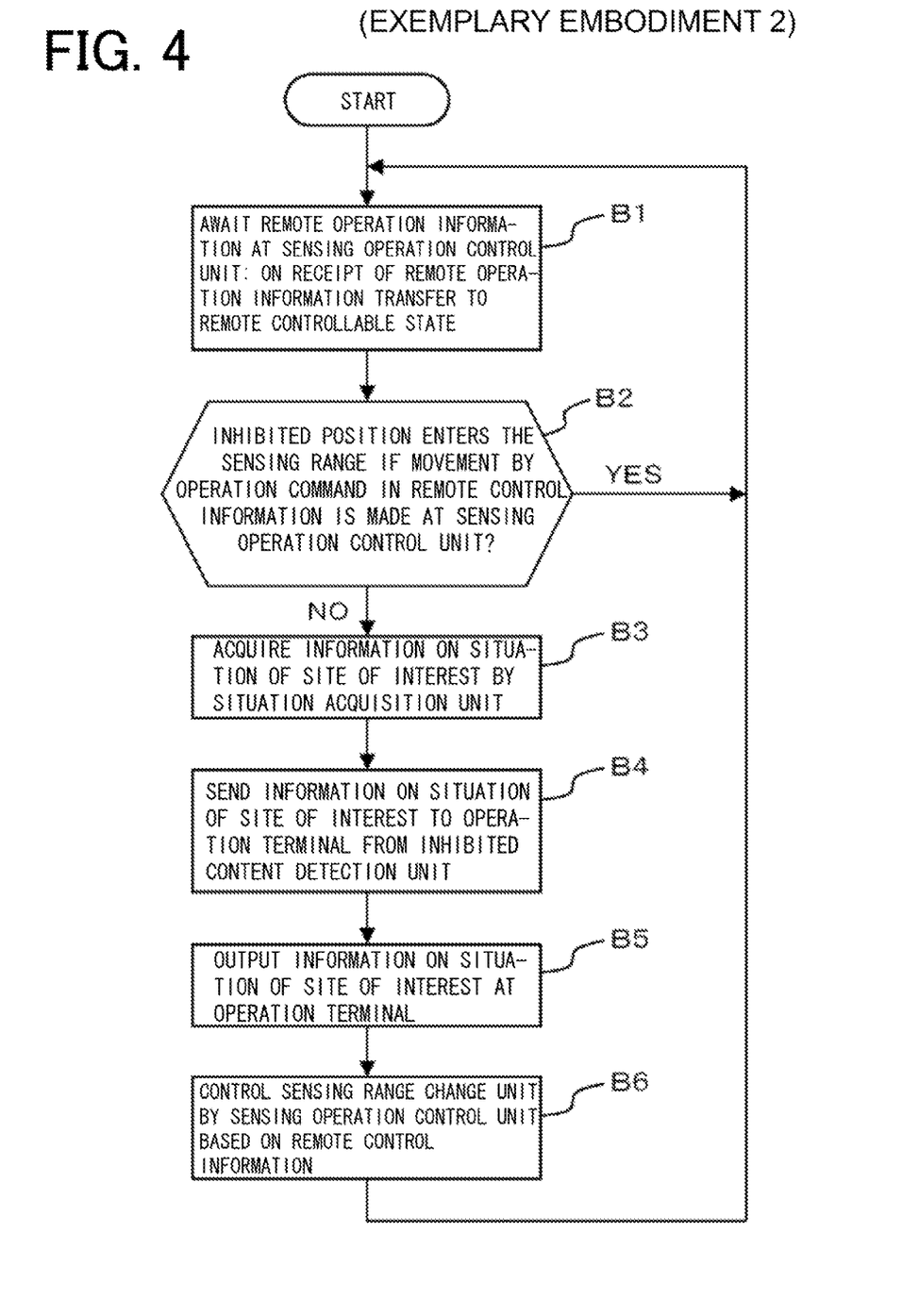
FIG. 4 is a flowchart schematically showing the operation of a sensing device according to Exemplary Embodiment 2 of the present invention.

The operation of Exemplary Embodiment 2 of the present invention will now be described with reference to the drawings. FIG. 4 depicts a flowchart schematically showing the operation of the sensing device according to Exemplary Embodiment 2 of the present invention.

First, the sensing operation controlling unit (15b of FIG. 1) awaits the remote operation information from the operation terminal. On receipt of the remote operation information, the sensing operation controlling unit transfers to the state that allows for the remote operation (step B1). The sensing operation controlling unit (15b of FIG. 1) then decides, in step B2, whether or not, in case the sensing range change unit (12 of FIG. 1) has realized the movement by the operation command in the remote operation information, the inhibited position on the path of such movement in the inhibited position information as stored in the storage unit (13 of FIG. 1) is comprised within the sensing range by the situation acquisition unit (11 of FIG. 1).

In case the inhibited position is not comprised within the sensing range (NO in step B2), the sensing operation controlling unit (15b of FIG. 1) acquires, in step B3, the information on the situation of the site of interest already acquired by the situation acquisition unit (11 of FIG. 1). The inhibited content detection unit (15a of FIG. 1) transmits, in step B4, the fraction of the input information on the situation of the site of interest that can be transmitted via the communication unit (14 of FIG. 1) to the operation terminal (20 of FIG. 1). After step B4, the operation terminal (20 of FIG. 1) receives the information on the situation of the site of interest, and outputs the so received information at the output unit (21 of FIG. 1) as a display or sound output (step B5). The sensing operation controlling unit (15b of FIG. 1) then controls the sensing range change unit (12 of FIG. 1) based on the remote operation information (step B6). Then, processing reverts to the step B1.

In case the inhibited position is comprised within the sensing range (YES in step B2), processing reverts to the step B1.

Exemplary Embodiment 2 yields an advantage similar to that in case of performing the remote operation. Moreover, in case of remote operating the sensing device (10 of FIG. 1), the advantage similar to that with Exemplary Embodiment 1 may be obtained. In addition, in Exemplary Embodiment 2, the movement of the sensing device (10 of FIG. 1) is restricted only in a problematic case where the content the user does not desire being transmitted has been detected. Hence, the volume of the image and/or the sound that may be sent may be increased in comparison with the case of unanimously restricting the movement of the sensing device (10 of FIG. 1).

Exemplary Embodiment 3

A sensing device according to Exemplary Embodiment 3 of the present invention will now be described.

In the sensing device of Exemplary Embodiment 3, the safe movement path information is generated by the sensing operation controlling unit (15b of FIG. 1) in performing the remote operation. The safe movement path information is such information that includes a path of movement such that the position of the inhibited position information is not comprised in the sensing range of the situation acquisition unit (11 of FIG. 1). If such safe movement path information has been generated, the sensing range change unit (12 of FIG. 1) may be controlled on the basis of the so generated safe movement path information. Otherwise, the present Exemplary Embodiment 3 is the same as Exemplary Embodiment 2.

Figure 5:
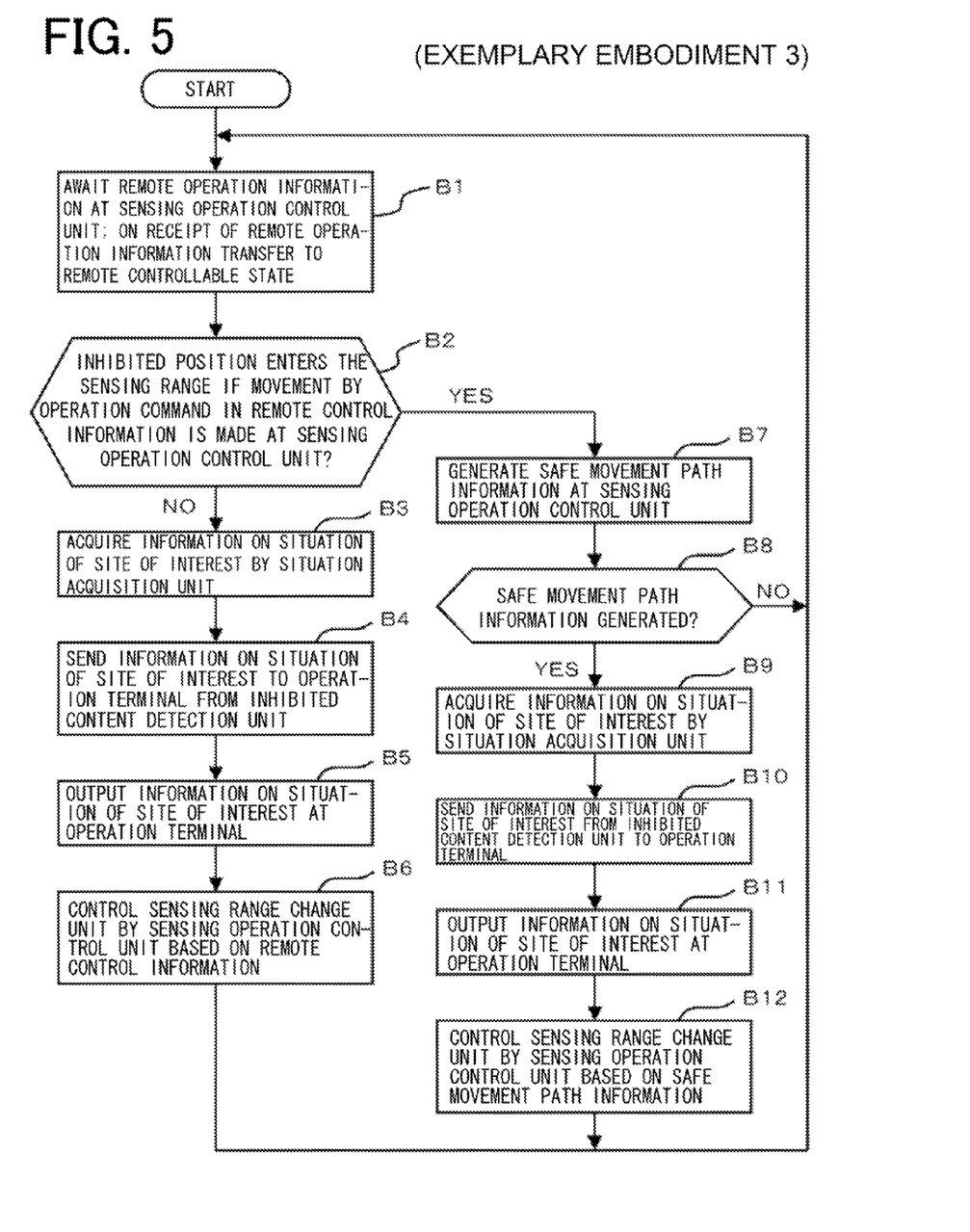
FIG. 5 is a flowchart schematically showing the operation of a sensing device according to Exemplary Embodiment 3 of the present invention.

The operation of the sensing device of Exemplary Embodiment 3 of the present invention will now be described with reference to the drawings. FIG. 5 depicts a flowchart schematically showing the operation of the sensing device according to Exemplary Embodiment 3 of the present invention.

First, the sensing operation controlling unit (15b of FIG. 1) awaits the remote operation information from the operation terminal. If there is such remote operation information, the sensing operation controlling unit transfers to the state that allows for the remote operation (step B1). Then, in step B2, the sensing operation controlling unit (15b of FIG. 1) decides whether or not, in case the sensing range change unit (12 of FIG. 1) has realized the movement by the operation command in the remote operation information, the inhibited position on the path of such movement in the inhibited position information as stored in the storage unit (13 of FIG. 1) is comprised within the sensing range by the situation acquisition unit (11 of FIG. 1).

In case the inhibited position is not comprised within the sensing range (NO in step B2), the sensing operation controlling unit (15b of FIG. 1) in step B3 acquires the information on the situation of the site of interest as acquired by the situation acquisition unit (11 of FIG. 1). Then, in step B4, the inhibited content detection unit (15a of FIG. 1) transmits the fraction of the input information on the situation of the site of interest that can be transmitted via the communication unit (14 of FIG. 1) to the operation terminal (20 of FIG. 1). After step B4, the operation terminal (20 of FIG. 1) receives the information on the situation of the site of interest, and outputs the so received information at the output unit (21 of FIG. 1) as a display or speech output (step B5). The sensing operation controlling unit (15b of FIG. 1) then controls the sensing range change unit (12 of FIG. 1) based on the remote operation information (step B6). Then, processing reverts to step B1.

In case the inhibited position is comprised within the sensing range (YES in step B2), the sensing operation controlling unit (15b of FIG. 1) generates, in step B7, the safe movement path information including the information on such path of movement that the total of the positions of the inhibited position information retained in the storage unit (13 of FIG. 1) is not comprised within the sensing range of the situation acquisition unit (11 of FIG. 1). The sensing operation controlling unit (15b of FIG. 1) then checks to see whether or not the safe movement path information has been generated (step B8).

In case the safe movement path information has not been generated (NO of step B8), the sensing operation controlling unit (15b of FIG. 1) reverts to step B1 without controlling the sensing range change unit (12 of FIG. 1).

If the safe movement path information has been generated (YES of step B8), the sensing operation controlling unit (15b of FIG. 1) in step B9 acquires the information on the situation of the site of interest by the situation acquisition unit (11 of FIG. 1). The inhibited content detection unit (15a of FIG. 1) then transmits the fraction of the input information on the situation of the site of interest that can be transmitted via the communication unit (14 of FIG. 1) to the operation terminal (20 of FIG. 1). After step B10, the operation terminal (20 of FIG. 1) receives the information on the situation of the site of interest, and outputs the so received information at the output unit (21 of FIG. 1) as a display or speech output (step B11). Then, in step B12, the sensing operation controlling unit (15b of FIG. 1) controls the sensing range change unit (12 of FIG. 1) based on the remote operation information. Then, processing reverts to step B1.

In Exemplary Embodiment 3, if, in case the movement by the operation command in the remote operation information has been realized, the inhibited position is comprised within the sensing range of the situation acquisition unit (11 of FIG. 1) on the path of movement, the remote operation is not immediately discontinued. Instead, such safe movement path information that the inhibited position is not comprised within the sensing range is generated to control the sensing range change unit (12 of FIG. 1). Hence, more image/sound than is possible with Exemplary Embodiment 2 may be transmitted to the operation terminal (20 of FIG. 1).

The foregoing description is made on the basis of the Exemplary Embodiments. However, the present invention is not limited to these Exemplary Embodiments. The particular exemplary embodiments or examples may be modified or adjusted within the gamut of the entire disclosure of the present invention, inclusive of claims, based on the fundamental technical concept of the invention. Moreover, variegated combinations or selections of the elements disclosed herein may be made within the scope of the claims.

Further tasks, objects and developments of the present invention will become apparent from entire disclosure of the present invention inclusive of claims.

The invention claimed is:

1. A sensing device comprising:
   a situation acquisition unit that acquires information on situation of a site of interest including at least one out of image and sound that have sensed the situation of said site of interest;
   a sensing range change unit that changes sensing range within which said situation acquisition unit may acquire said information on said situation of said site of interest;
   a position identification unit that identifies position of said situation acquisition unit with respect to an environment of said site of interest;
   an inhibited content detection unit; said inhibited content detection unit detecting an inhibited content, an inhibition object of transmission, from said information on said situation of said site of interest acquired by said situation acquisition unit; said inhibited content detection unit calculating, in case said inhibited content has been detected, the position of said inhibited content in the environment of said site of interest, based on the position identification information from said position identification unit; said inhibited content detection unit writing, in a storage unit, the inhibited position information including the position of said inhibited content in the environment of the site of interest calculated; and
   a sensing operation controlling unit that controls, based on said inhibited position information stored in said storage unit, said sensing range change unit so that the position of said inhibited content is not contained in said sensing range;
   said inhibited content detection unit outputting, in case said inhibited content has not been detected, said information on the situation of said site of interest from said situation acquisition unit to an operation terminal.

2. The sensing device according to claim 1, wherein
   said situation acquisition unit comprises a plurality of sensors having different sensing ranges;
   said inhibited content detection unit detecting the inhibited content even from the information on the situation of said site of interest from one or more of said sensors not transmitted to said operation terminal.

3. The sensing device according to claim 1, wherein
   on receipt from said operation terminal of a remote operation information including an operation command, said sensing operation controlling unit calculates, in consideration of said position identification information from said position identification unit at a time point of receipt of said remote operation information and the inhibited position information stored in said storage unit, whether or not said inhibited content is comprised within said sensing range in case said operation command in said remote operation information is executed;
   said sensing operation controlling unit controlling said sensing range change unit, based on said operation command, in case said inhibited content does not fall within said sensing range.

4. The sensing device according to claim 3, wherein
   if said inhibited content falls within said sensing range, said sensing operation controlling unit refrains from controlling said sensing range change unit based on said operation command.

5. The sensing device according to claim 3, wherein
   if said inhibited content falls within said sensing range, said sensing operation controlling unit generates safe movement path information including a path of movement such that said inhibited content does not fall within said sensing range; said sensing operation controlling unit controlling said sensing range change unit, based on said safe movement path information, in case said safe movement path information has been generated.

6. The sensing device according to claim 5, wherein
   said sensing operation controlling unit refrains from controlling said sensing range change unit based on said operation command in case said safe movement path information has not been generated.

7. A system comprising:
   the sensing device according to claim 1; and
   said operation terminal having an output unit that outputs said information on the situation of said site of interest as sensed by said sensing device.

8. The system according to claim 7, wherein
   said operation terminal has an input unit that receives remote operation information.

9. A controlling method comprising:
   acquiring, by a sensing device, an information on a situation of a site of interest including at least one out of image and sound that have been sensed at the situation of said site of interest;
   identifying, by said sensing device, an own position with respect to an environment of said site of interest;
   detecting, by said sensing device, an inhibited content, an inhibition object of transmission, from said information on said situation of said site of interest, calculating, in case said inhibited content has been detected, the position of said inhibited content in the environment of said site of interest, based on the position identification information identified; and
   storing the information on the inhibited position including the position of said inhibited content in the environment of said site of interest calculated;
   controlling, by said sensing device, a sensing range, based on said inhibited position information stored, so that the position of said inhibited content is not contained in said sensing range; and
   outputting, by said sensing device, in case said inhibited content has not been detected, the information on the situation of said site of interest acquired to an operation terminal.

10. A medium storing a controlling program for causing a sensing device to execute:
    acquiring, by a sensing device, an information on the situation of a site of interest including at least one out of an image and the sound that have sensed the situation of said site of interest;
    identifying, by said sensing device, an own position with respect to an environment of said site of interest;
    detecting, by said sensing device, an inhibited content, an inhibition object of transmission, from said information on said situation of said site of interest, calculating, in case said inhibited content has been detected, the position of said inhibited content in the environment of said site of interest, based on the position identification information identified; and storing the information on the inhibited position including the position of said inhibited content in the environment of said site of interest calculated;
    controlling, by said sensing device, a sensing range, based on said inhibited position information stored, so that the position of said inhibited content is not contained in said sensing range; and
    outputting, by said sensing device, in case said inhibited content has not been detected, the information on the situation of said site of interest acquired to an operation terminal.

* * * * *